United States Patent
Stark

(10) Patent No.: US 7,444,259 B2
(45) Date of Patent: Oct. 28, 2008

(54) AUTOMATIC ACQUISITION OF DATA REFERENCED IN USER EQUATION

(75) Inventor: Donald W. Stark, Santa Rosa, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 8 days.

(21) Appl. No.: 11/550,761

(22) Filed: Oct. 18, 2006

(65) Prior Publication Data

US 2008/0097716 A1 Apr. 24, 2008

(51) Int. Cl.
*G06F 19/00* (2006.01)
*G05B 19/42* (2006.01)

(52) U.S. Cl. .................................. 702/123; 700/87
(58) Field of Classification Search ................ 702/123, 702/68, 76, 109, 119, 124, 127, 179, 189; 700/84, 86–87, 89; 324/638, 646; 345/440
See application file for complete search history.

(56) References Cited

U.S. PATENT DOCUMENTS

| 4,816,767 | A | * | 3/1989 | Cannon et al. ............... 324/601 |
| 5,299,138 | A | * | 3/1994 | Fiori et al. ..................... 702/22 |
| 6,529,844 | B1 | * | 3/2003 | Kapetanic et al. ............. 702/85 |
| 6,691,050 | B2 | * | 2/2004 | Stark ........................... 702/66 |
| 6,728,655 | B2 | * | 4/2004 | Stark ........................... 702/123 |
| 6,965,241 | B1 | * | 11/2005 | Liu et al. ..................... 324/601 |
| 2007/0233409 | A1 | * | 10/2007 | Boyan et al. .................. 702/76 |

* cited by examiner

*Primary Examiner*—Michael P. Nghiem
*Assistant Examiner*—Toan M Le
(74) *Attorney, Agent, or Firm*—Judy Liao Shie

(57) ABSTRACT

An apparatus includes a parser, a semantic checker, a data manager and an equation processor. The parser receives a first equation for manipulating data acquired by an instrument and detects an operand in the first equation, the instrument having a set of data acquisition capabilities. The semantic checker recognizes that the first operand refers to first data that can be acquired by the instrument using a first capability from the set of data acquisition capabilities. The data manager configures the instrument automatically to acquire the first data using the first capability after recognizing that the first operand corresponds to the first data. The equation processor computes a result of the first equation using the acquired first data.

20 Claims, 3 Drawing Sheets

AUTOMATIC ACQUISITION OF DATA REFERENCED IN USER EQUATION

BACKGROUND OF THE INVENTION

Test and measurement instruments (e.g. signal capture and analysis instruments such as spectrum analyzers, oscilloscopes, multimeters, network analyzers; signal source instruments such as signal generators, DC sources, and other waveform or power sources) are used to acquire and display measurement data, typically from a device under test (DUT).

Frequently, a user needs to manipulate data gathered by the measurement instrument. For example, the user may want to add two signals together, subtract one signal from another, scale a measurement by a constant factor, etc.

To illustrate further, suppose the measurement instrument is a network analyzer. A network analyzer is capable of measuring the S-parameters of an electrical network. In a two-port network, the S-parameters are denoted by the notation S11, S12, S21, and S22. A user may want compute an equation using two S-parameters for operands as follows:

$$2*(S11)^3 + S12 \qquad \text{equation (1)}$$

Typically, the user would also want to see the result of the equation displayed real-time as it is computed, since the S-parameters may also change with time.

Previously, the user had to explicitly set up a trace identifying the specific data to be measured, prior to or separately from entering the equation. In our network analyzer example, the user would have had to first set up two traces: a first trace (call it "Tr1") to measure S11, and a second trace (call it "Tr2") to measure S12. The traces are necessary to indicate to the measurement instrument that further calculations or manipulations of the measured data would be required. After setting up the traces, the user would use the traces to compute an equation containing references to measurement data. For example, equation (1) would have to be entered on a previous measurement instrument as follows:

$$2*\text{pow}(Tr1,3) + Tr2. \qquad \text{equation (2)}$$

where pow is a "power" function such that pow(X,Y) computes X to the power of Y.

This additional step of setting up traces requires extra work, and makes the process of getting the desired result (the result of computing the equation) more cumbersome for the user.

There remains a need for a simpler way to use measurement data as operands in an equation on a measurement instrument.

SUMMARY OF THE INVENTION

An instrument having a set of data acquisition capabilities recognizes an operand in an equation as a data reference when the operand refers to data which the instrument is capable of acquiring. The instrument automatically configures itself to acquire the data to which the operand refers.

GLOSSARY

For the description of the present invention, the following terms shall have the meanings here set forth:

"Test and measurement instrument" means any instrument used to determine a characteristic or parameter of a device under test. This definition includes instruments such as signal sources, which create signals that are used in a measurement, for example signals that serve as a reference or standard in a measurement. The term "measurement instrument" is used interchangeably with "test and measurement instrument" and "instrument". Examples of measurement instruments include (but are not limited to): spectrum analyzers, network analyzers, logic analyzers, protocol analyzers, oscilloscopes, multimeters, voltmeters, power meters, frequency counters, impedance analyzers, signal sources, gas chromatographs/mass spectrometers, etc.

"Measurement data" means any data that can be acquired by a test and measurement instrument.

"Data reference" means an operand in an equation that refers to measurement data that a test and measurement instrument has the capability of acquiring.

DETAILED DESCRIPTION

For the sake of discussion and ease of comprehension for the reader, all examples hereinafter will assume that the measurement instrument is a network analyzer. However, it should be understood that the present invention is not limited to network analyzers, and is applicable to all measurement instruments.

Figure 1:
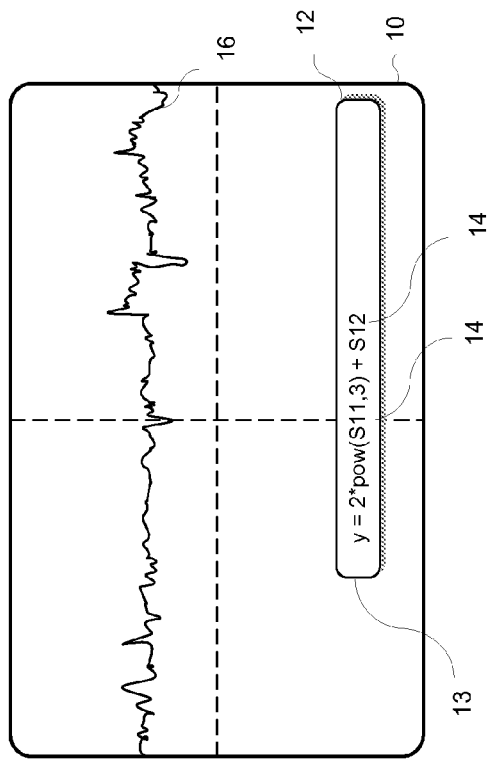
FIG. 1 shows an exemplary display of a measurement instrument, in which an equation editor according to embodiments of the present invention may be practiced.

FIG. 1 shows an exemplary display 10 of a measurement instrument, in which an equation editor 12 according to embodiments of the present invention may be practiced. A user enters an equation 13 into the equation editor 12. In one embodiment, the equation editor 12 is a graphical window in the display 10 through which the user can enter the equation 13. However, the equation editor 12 does not have to be a graphical window—it can be any mechanism or manner through which the instrument can accept data entry.

In FIG. 1, equation (1) is used as an exemplary equation. Equation (1) is entered into the equation editor as the text string "2*pow(S11,3)+S12", where pow is a "power" function such that pow(X,Y) computes X to the power of Y.

The equation 13 has data references 14. A data reference is any operand in the equation 13 that refers to measurement data that a test and measurement instrument has the capability of acquiring. The data references 14 in equation 13 are the S-parameters S11 and S12. As will be explained below, the equation editor 12 automatically acquires the measurement data for data references 14 in the equation 13, computes the result 16 of equation 13, and displays the result 16 in display 10.

The display 10 in FIG. 1 can be physically located on the measurement instrument itself, or it may be a remote display on a client in communication with the measurement instrument (e.g. a personal computer or other device with display capabilities). In one embodiment, the equation editor 12 is a text-entry window that is displayed simultaneously with the equation result 16 within the display 10. However, it is unnecessary for the purposes of the present invention for the equation editor 12 to be shown within the display 10.

Figure 2:
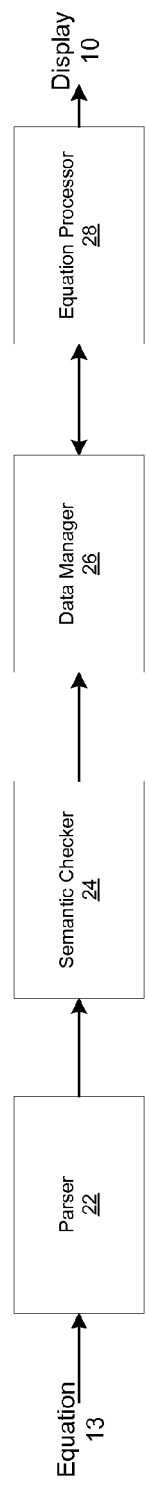
FIG. 2 shows a high-level block diagram of an exemplary system for implementing an equation editor, according to embodiments of the present invention.

FIG. 2 shows a high-level block diagram of an exemplary system 20 for implementing an equation editor 12, according to embodiments of the present invention. This system 20 provides for automatic acquisition of any measurement data that appears as a data reference 14 in a user-entered equation 13. In one embodiment, the system 20 includes a parser 22, a semantic checker 24, a data manager 26, and an equation processor 28.

The user of the measurement instrument enters a text string that is an equation 13. The equation can include functions, operators, and operands which can be data references 14 to measurement data. The types of operations that may be computed may differ from one instrument to another, but typically will include mathematical operations such as addition, subtraction, multiplication, division, trigonometric functions such as sine/cosine, square root, exponential functions, etc.

The parser 22 determines whether the syntax of the equation 13 matches what has been defined as legal for an equation in that particular measurement instrument. For example, operators such as +, −. * (multiply) and / (divide) are all binary operators, and must each have two operands or else the syntax requirements are not met. Function calls must have their number of operands checked as well. For example, the function pow(X,Y) as used in equation (1) computes X to the power of Y, and must have only two operands or else it violates the syntax requirements.

Figure 3:
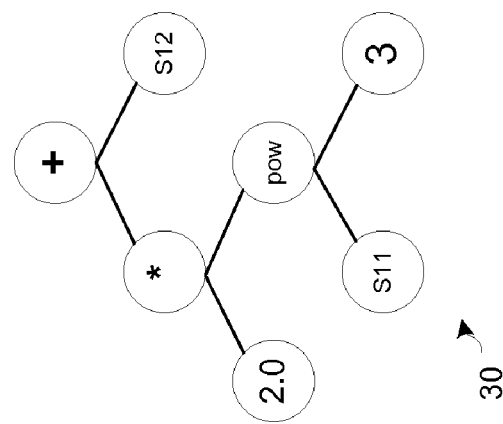
FIG. 3 shows an exemplary abstract syntax tree for equation (1).

Once the equation syntax has been verified as being valid, the parser 22 outputs an abstract syntax tree (AST), which is a structure familiar to one of ordinary skill in the art. Other structures may be used to represent the equation as well. FIG. 3 shows an exemplary AST 30 for equation (1), which is repeated below for convenience:

$$2*pow(S11,3)+S12 \quad \text{equation (1)}$$

The AST 30 is a symbolic representation of the equation parsed by the parser 22. Any node having child nodes branching off is an operator, such as nodes "+", "*", and "pow". Any node that is an end-node without child nodes is an operand, such as nodes "S12", "2.0", "S11", and "3".

Once a valid AST has been generated, the semantic checker 24 traverses the AST 30 and examines each node to ensure that every node is a valid operator or operand as defined by the measurement instrument.

In one embodiment, the semantic checker 24 checks an operand against a list of names that correspond to all the data that the instrument is capable of obtaining for the user at that particular point in time. If the operand appears in the list maintained by the measurement instrument, then it is valid as a data reference 14. Any remaining operands in the equation are evaluated in the same manner. In one embodiment, the equation editor 12 includes a visual listing, readable by a user, of all the instrument capabilities that are available to be used as data references in an equation.

Once the equation 13 is found to be semantically valid, the semantic checker 24 compiles a list of valid data references 14 and passes it to the data manager 26. In the example of equation (1), the data reference list would include "S11" and "S12".

In the past, traces had to be previously set up by the user to identify the measurement data the user wanted to acquire. Only these user-defined traces could be data references within an equation. Now, every data acquisition capability of the measurement instrument available to the user can be used as a data reference. The data references used in the equation refer directly to the data In one embodiment, an operand can be a user-defined variable that includes data references. For example, for the purposes of simplifying data entry, a user may wish to define a variable named "foo", where foo=S11+S22/S21. The variable "foo" can then be used in subsequent equations, such as:

$$y=(pow(foo,2)+1)/foo$$

This feature saves the user numerous keystrokes in entering an equation.

Figure 4:
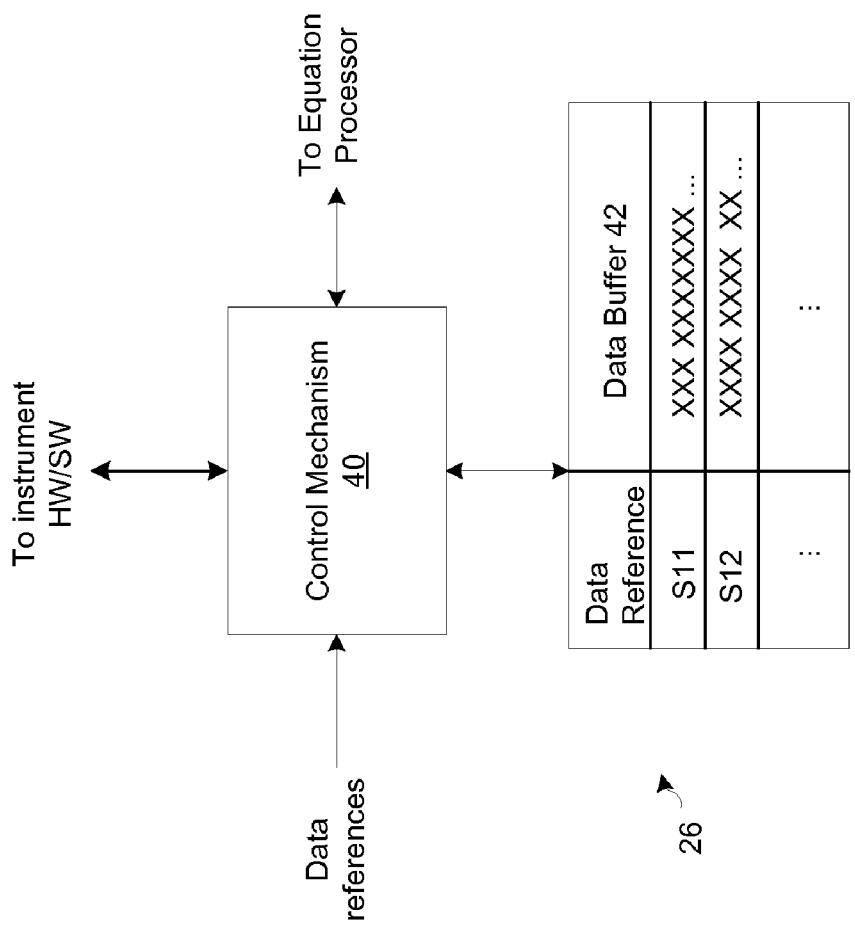
FIG. 4 shows a block diagram view of the data manager, according to embodiments of the present invention

FIG. 4 shows a block diagram view of the data manager 26, according to embodiments of the present invention. A control mechanism 40 of the data manager 26 configures the underlying measurement instrument software (SW) and hardware (HW) to acquire the measurement data corresponding to each of the valid data references 14 within the equation. For each data reference 14 in the equation, the control mechanism 40 allocates an entry mapping the data reference to a corresponding data buffer 42 where the measurement data is stored. In one embodiment, the control mechanism 40 ensures that even if there are multiple instances of a data reference in an equation (such as would occur in an equation having the term "S11*S11"), only one copy of measurement data is acquired and maintained for the sake of efficiency. Once configured, the underlying measurement instrument SW and HW acquire the specified measurement data. The control mechanism 40 monitors the data buffers 42, reporting any changes to the equation processor 28.

In one embodiment, the control mechanism 40 also manages so called "raw" data vs. "corrected" data. In some measurement instruments, users perform calibrations that produce correction data which are later used to remove systematic errors from measurement data. Uncorrected measurement data is called "raw" data. Data from which systematic errors have been removed is called "corrected" data. Generally, corrected data is preferred by the end user as it produces a more accurate result.

If it is possible to provide corrected data corresponding to the data references, the control mechanism 40 ensures that raw data required to produce the corrected data is acquired, and that the data reference refers to corrected data such that the equation processor 28 will use the corrected data. If no corrected data is available, the data manager 26 will use the raw data instead. The availability of corrected data is affected by several factors, such as whether the user has enabled error correction, whether calibration terms to represent systematic errors are available, etc. The automatic acquisition of data referenced by the user extends to the error correction system so that corrected data can be provided in preference to just raw data. Any additional data that must be acquired to produce any given corrected data is done automatically and is invisible to the user.

The equation processor 28 computes the result of the equation 13, and recomputes the equation 13 whenever there are any changes to the data in the data buffers 42. In one embodiment, the equation processor 28 does a depth-first traversal of the AST 30 and evaluates the value at each node. If the node is a data reference 14 (e.g. "S11", "S12"), then the equation processor 28 requests the corresponding data buffer 42 from the data manager 26. Thus, the data references are incorporated into the equation result. The AST 30 is traversed for each data point produced for the equation result.

Figure 5:
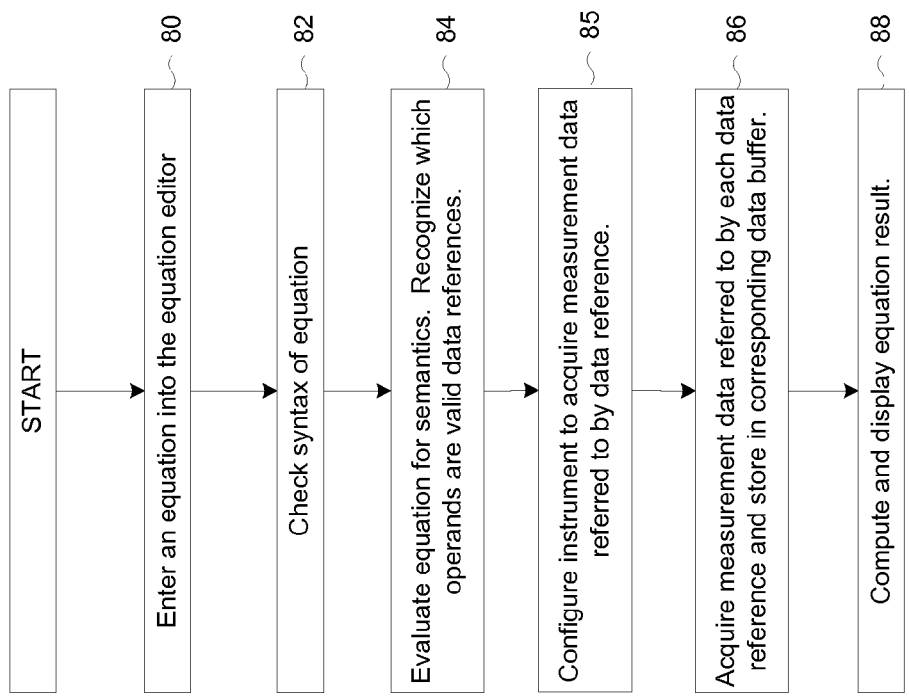
FIG. 5 is a flow chart describing the operation of an equation editor according to embodiments of the present invention.

FIG. 5 is a flow chart describing the operation of an equation editor according to embodiments of the present invention. In step 80, an equation is entered into the equation editor. In step 82, the equation is checked for syntax. Next, in step 84, the equation is evaluated to ensure it is semantically correct. This includes recognizing which operands of the equation are valid data references.

Next in step 85, the instrument automatically configures itself to acquire the measurement data referred to by each data reference. Then in step 86, the measurement data referred to by each data reference is acquired and stored in a corresponding data buffer. This includes obtaining corrected data if any is available, or using raw data if no corrected data exists. Finally, in step 88, the result of the equation is computed and displayed. This process is repeated if any changes are made to the equation, such as adding new data references or deleting previously used data references.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A method for manipulating data acquired by an instrument having a set of data acquisition capabilities, the method comprising:
    receiving a first equation for manipulating the data acquired by the instrument;
    detecting a first operand in the first equation;
    recognizing that the first operand corresponds to first data that can be acquired by a first capability from the set of data acquisition capabilities;
    configuring the instrument automatically to use the first capability to acquire the first data after recognizing that the first operand corresponds to the first data; and
    computing a result of the first equation using the acquired first data.

2. The method as in claim 1, further comprising:
    adding a second operand to the first equation;
    recognizing that the second operand corresponds to second data that can be acquired by a second capability from the set of data acquisition capabilities; and
    reconfiguring the instrument automatically to further acquire the second data using the second capability.

3. The method as in claim 2, further comprising:
    computing the result for the first equation using the second data in addition to the first data.

4. The method as in claim 1, further comprising:
    deleting the first operand from the first equation; and
    reconfiguring the instrument automatically to stop using the first capability.

5. The method as in claim 1, wherein configuring the instrument to use the first capability to acquire the first data comprises:
    associating the operand with a corresponding buffer;
    acquiring the first data; and
    storing the first data in the corresponding buffer.

6. The method as in claim 5, further comprising:
    displaying the result on a display associated with the instrument.

7. The method as in claim 5, wherein using the first capability to acquire the first data comprises:
    determining whether the first data can be corrected by removing systematic errors; and
    removing systematic errors from the first data.

8. The method as in claim 1, further comprising:
    using the result of the first equation in a second equation.

9. The method as in claim 1, wherein recognizing that the first operand corresponds to first data that can be acquired by a first capability from the set of data acquisition capabilities comprises:
    maintaining a list of names corresponding to all data acquisition capabilities supported by the instrument; and
    determining that the operand is a member of the list of names.

10. The method as in claim 1, wherein the first operand comprises a user-defined variable representing an expression, the expression including a reference to the first data that can be acquired by the first capability.

11. The method as in claim 1, wherein first equation is received through a text entry area in a display associated with the instrument.

12. The method as in claim 1, further comprising:
    displaying a list of the set of data acquisition capabilities in a display associated with the instrument.

13. The method as in claim 1, wherein the instrument is selected from the group consisting of network analyzers, spectrum analyzers, logic analyzers, protocol analyzers, oscilloscopes, multimeters, voltmeters, power meters, frequency counters, impedance analyzers, signal sources, gas chromatographs, and mass spectrometers.

14. An apparatus, comprising:
    a parser for receiving a first equation for manipulating data acquired by an instrument and detecting an operand in the first equation, the instrument having a set of data acquisition capabilities;
    a semantic checker for recognizing that the first operand refers to first data that can be acquired by the instrument using a first capability from the set of data acquisition capabilities;
    a data manager for configuring the instrument automatically to acquire the first data using the first capability after recognizing that the first operand corresponds to the first data; and
    an equation processor for computing a result of the first equation using the acquired first data.

15. The apparatus as in claim 14, further comprising:
    a buffer associated with the operand, wherein the data manager stores the first data acquired by using the first capability.

16. The apparatus as in claim 15, wherein the data manager comprises:
    a control mechanism that determines whether the first data can be corrected by removing systematic errors to create corrected data, and that obtains corrected data when available.

17. The apparatus as in claim 14, wherein the equation processor automatically recomputes the result of the equation in response to changes to the first data.

18. The apparatus as in claim 14, wherein the semantic checker checks the operand against a stored list of names corresponding to the set of data acquisition capabilities supported by the instrument.

19. The apparatus as in claim 14, further comprising:
    a display associated with the instrument for displaying the result of the equation, the display comprising a text entry area in which the first equation is entered by a user.

20. The apparatus as in claim 19, wherein the display displays a list of the set of data acquisition capabilities in the display associated with the instrument.

* * * * *